F. H. REICHARD.
WEEDER AND HOE.
APPLICATION FILED APR. 15, 1914.
1,136,438.
Patented Apr. 20, 1915.
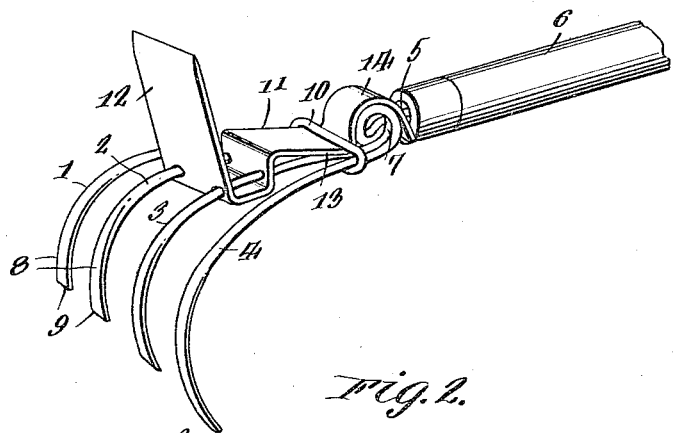
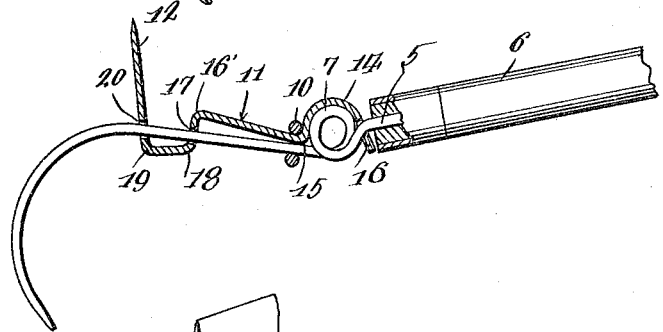
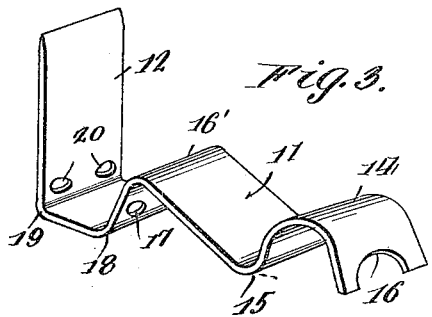
Witnesses
Guy M. Spring.
W. E. Valk Jr.
Inventor
Francis H. Reichard.
By Richard Beaven,
his Attorney

UNITED STATES PATENT OFFICE.

FRANCIS H. REICHARD, OF BANGOR, PENNSYLVANIA.

WEEDER AND HOE.

1,136,438.   Specification of Letters Patent.   Patented Apr. 20, 1915.

Application filed April 15, 1914. Serial No. 832,097.

*To all whom it may concern:*

Be it known that I, FRANCIS H. REICHARD, citizen of the United States, residing at Bangor, in the county of Northampton and State of Pennsylvania, have invented certain new and useful Improvements in Weeders and Hoes, of which the following is a specification.

This invention relates to improvements in weeders and hoes particularly adapted for garden use, said invention being especially designed as an improvement over the implement shown in a former patent granted to Lewis E. Whitaker, July 25, 1911, #998,661, said patent having been assigned to me.

As its primary object, the invention contemplates a hoe attachment for garden weeders wherein the hoe blade and shank are so arranged relatively to the teeth or tines of the weeder as to be resiliently supported thereby; the shank of the hoe being suitably bent and perforated to receive the tines and effect a brace therefor.

The above and additional objects are accomplished by such means as are illustrated in their preferred embodiment in the accompanying drawings, described in the following specification and then more particularly pointed out in the claims which are appended hereto and form a part of this application.

In describing my invention in detail reference will be had to the accompanying drawings wherein like characters denote like or corresponding parts throughout the several views, and in which:—

Figure 1 is a perspective view of the weeder with the improved hoe attached thereto; Fig. 2 is a longitudinal sectional view, the handle of the device being shown in elevation; and Fig. 3 is a detail perspective view of the hoe attachment.

Referring now to the drawings by numerals, the device shown in Figs. 1 and 2 is formed of a series of wires 1, 2, 3 and 4, said wires being twisted together in the manner shown to form a shank 5. The shank 5 thus formed is fitted or driven into the socketed end of the handle 6, and at a point adjoining the projecting end of the shank, the wires are bent up in pairs to form obliquely disposed coils 7, the ends of which are extended forwardly and bent downwardly to form the tines 8, which terminate in flattened extremities 9. As formed, the tines tend to separate and are held equidistance apart by a link 10. The hoe attachment, designated as an entirety by the numeral 11 includes a blade 12 and a shank 13, said shank being bent as indicated at 14 to fit over and upon the coils 7 and to rest upon, as indicated at 15, the tines 8 of the weeder. The free or inner end of the shank is cut away as indicated at 16 to receive the shank 5 of the weeder and to fit upon the respective sides thereof.

From the point 15 where the shank engages the tines 8, said shank extends forwardly, and at an angle to the said tines 8 to a point 16' where it is bent downwardly, the tines 8, that is, certain of the said tines, passing through openings 17 in the bent portion of the shank, the latter being again bent as at 18 to extend forwardly to a point 19, from which point the blade 12 extends.

Adjacent the bend 19 and within the blade 12 perforations 20 are formed, said perforations being alined with the perforations 17 above noted to provide for the passage of the tines therethrough in the manner illustrated to advantage in the said Figs. 1 and 2 of the drawings. The link or band 10 is of a size sufficiently large to receive the shank, said link thereby serving the dual purpose of maintaining the shank in engagement with the coils 7 and upon the tines 8 and also as a means whereby the tines are held in uniform spaced relation.

From the foregoing, taken in connection with the accompanying drawings it will be noted that the hoe attachment serves as a brace for the tines, and as the tines in turn serve as a resilient support for the said attachment, the latter being directly secured thereto entirely independent of the handle 6, which mode of attachment has proved objectionable upon actual practice.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent, is:—

1. An attachment for garden implements including in combination with the implement itself, a blade, a shank integral with the blade, the shank having an opening formed therein, the said shank opening being alined with an opening of the blade, a portion of the implement passing through the said alined openings to serve as a brace for the attachment, as and for the purpose set forth.

2. An attachment for garden implements including in combination with the implement itself, a blade having openings formed therein, a shank integral with the blade and extending at an angle thereto, the shank, being shaped to conform to the configuration of that portion of the implement to which it is secured, the said shank having openings formed therein in alinement with the opening in the blade, means attaching the shank to the implement, the engagement between the said attachment and the said implement serving as a brace for the latter and a spring support for the former, as and for the purpose set forth.

3. An attachment for garden implements including in combination with an implement a blade, a shank bent intermediate its ends, a portion of the shank being shaped to conform to the configuration of the implement itself, part of the implement passing through the said shank and blade to form an attaching means therefor, and means engaging both the attachment and the implement for holding the latter against movement longitudinally of the former, as and for the purpose set forth.

4. An attachment for garden implements including in combination with an implement a hoe blade, disposed to extend at an angle to the back of the implement to which it is attached, a shank integral with the blade and extending at an angle thereto, the said shank and the said blade being provided with alined openings through which portions of the implement extends, said attachment serving as a brace for the implement and the implement as a yieldable support for the attachment, as and for the purpose set forth.

5. In a garden tool, the combination with a weeding implement including a plurality of resilient tines, of a hoe attachment comprising a blade having openings formed therein, a shank integral with said blade, said shank having openings formed therein, the said openings of the blade and shank adapted to receive the tines, as and for the purpose set forth.

6. In a garden tool, the combination with a weeding implement including a plurality of resilient tines, of a hoe attachment comprising a blade having openings formed therein, a shank integral with said blade, said shank being bent to conform to the configuration of the tines, said shank having openings formed therein, said openings being alined with the blade openings aforesaid, certain of the said tines adapted to pass through said openings, the attachment serving as a brace for the implement and the implement serving as a support for the attachment, as and for the purpose set forth.

In testimony whereof I affix my signature in presence of two witnesses.

FRANCIS H. REICHARD.

Witnesses:
 Geo. H. Leh,
 Russell J. Buzzard.

Copies of this patent may be obtained for five cents each, by addressing the "Commissioner of Patents, Washington, D. C."